US012695311B2

(12) United States Patent
Kundu et al.

(10) Patent No.: US 12,695,311 B2
(45) Date of Patent: Jul. 28, 2026

(54) ADAPTIVE INTELLIGENT CONTROLS FOR RESILIENT INTEGRATION OF ENERGY SYSTEMS

(71) Applicant: BATTELLE MEMORIAL INSTITUTE, Richland, WA (US)

(72) Inventors: Soumya Kundu, Richland, WA (US); Sai Pushpak Nandanoori, Richland, WA (US); Veronica A Adetola, Richland, WA (US); Karanjit Kalsi, Richland, WA (US)

( * ) Notice: Subject to any disclaimer, the term of this patent is extended or adjusted under 35 U.S.C. 154(b) by 0 days.

(21) Appl. No.: 18/800,897

(22) Filed: Aug. 12, 2024

(65) Prior Publication Data

US 2025/0062626 A1 Feb. 20, 2025

Related U.S. Application Data

(60) Provisional application No. 63/520,405, filed on Aug. 18, 2023.

(51) Int. Cl.
| | |
|---|---|
| *H02J 3/48* | (2026.01) |
| *H02J 3/1807* | (2026.01) |
| *H02J 3/388* | (2026.01) |
| *H02J 103/35* | (2026.01) |

(52) U.S. Cl.
CPC .............. *H02J 3/48* (2013.01); *H02J 3/1807* (2013.01); *H02J 3/388* (2020.01); *H02J 2103/35* (2026.01)

(58) Field of Classification Search
CPC .. H02J 3/48; H02J 3/388; H02J 3/1807; H02J 2203/10
See application file for complete search history.

(56) References Cited

U.S. PATENT DOCUMENTS

| | | | | |
|---|---|---|---|---|
| 8,498,752 B2 * | 7/2013 | Wells | ......................... | H02J 3/50 |
| | | | | 700/297 |
| 2022/0077688 A1 * | 3/2022 | Patarroyo | ................. | H02J 3/46 |

* cited by examiner

*Primary Examiner* — Carlos Amaya
(74) *Attorney, Agent, or Firm* — Merchant & Gould P.C.

(57) ABSTRACT

Local, autonomous rules for grid-forming inverter control are disclosed herein that maintain sufficient inverter capacity in the event of disruptions. The controls only rely on local measurements of frequency, voltage, real and reactive power, and real and reactive power set-points. Inverters using such controls do not need neighboring node or inverter measurements. Additionally, the control systems described herein apply local inverter parameters such as droop gains and inverter capacity. These local controls provide robustness to uncertainty in the measurements or to malicious data, and require very little computational power to obtain appropriate set points independent of topology or network parameters.

15 Claims, 9 Drawing Sheets

⊘ Grid Forming Inverter
▨ Open switch
▨ Closed switch

⊗ Grid Forming Inverter
▨ Open switch
▨ Closed switch

○ Grid Forming Inverter

▨ Open switch

▨ Closed switch

ADAPTIVE INTELLIGENT CONTROLS FOR RESILIENT INTEGRATION OF ENERGY SYSTEMS

REFERENCE TO RELATED APPLICATION

This application claims the benefit of U.S. Provisional Patent Application No. 63/520,405, filed on Aug. 18, 2023, the disclosure of which is incorporated herein by reference in its entirety.

STATEMENT OF GOVERNMENT INTEREST

This invention was made with government support under Contract DE-AC05-76RL01830 awarded by the U.S. Department of Energy. The government has certain rights in the invention.

FIELD OF THE INVENTION

The present invention relates generally to systems and processes for parallelly feeding a single network by two or more generators, converters, distributed power sources, or transformers. The systems and processes described herein address potential disruptions caused by islanding, or disconnection of local power supply from a larger grid or network.

BACKGROUND

Throughout a power distribution grid, it is important to maintain frequency and voltage within a so-called "safety set." However, frequency and voltage are not constant over time as loads and power generation sources are added or removed from the grid or change their draw or their input. NERC standards PRC-024-1 (2014) and PRC-024-2 (2015) have been developed to define the protective relay settings for frequency and voltage at the generating entities to maintain grid connection and power system stability. These standards require that frequency of the grid remain between 59.5 Hz to 60.5 Hz, off-normal frequency excursions remain minimal, instantaneous underfrequency relay trip settings are set to no higher than 57.8 Hz, and instantaneous over frequency relay trip settings are set no lower than 62.2 Hz.

Maintaining these conditions is complicated by increasingly-frequent disruptions to connections within a grid. For instance, wildfires in California such as the Blue Cut Fire and the Canyon 2 Fire of Aug. 16, 2016, and Oct. 9, 2017, respectively, resulted in a loss of generation of 1200 MW and 900 MW as inverters tripped due to frequency and voltage violations.

It is simultaneously desirable to maintain grid connections and reliability, while also maintaining frequency and voltage within defined ranges, which can be competing goals. Complicating this, disruptions such as those caused by wildfires are becoming increasingly frequent, making maintaining both of these competing goals even more difficult. Accordingly, solutions are needed that avoid unnecessary grid disruptions even in the event of disruptions.

SUMMARY

A distributed energy element for maintaining a state variable of a power distribution network is described herein. The distributed energy element includes or is coupled to a source of distributed energy. A grid-forming or grid-following controller is configured to output an amount of electrical energy from the source of distributed energy that varies as a function of time. The amount of electrical energy is determined by a control setpoint, by using a controller to adjust that control setpoint to maintain the state variable x according to the equations:

$$\begin{cases} u \ge -\dfrac{1}{g(x)}(f(x) + \alpha h(x)^n) & \text{if } g(x) > 0 \\ u \le -\dfrac{1}{g(x)}(f(x) + \alpha h(x)^n) & \text{if } g(x) < 0 \end{cases}$$

where u is the control setpoint, and the controller operates according to a state model in which the derivative of the state variable $\dot{x} = f(x) + g(x)u$.

N can be any odd number, but in one example described herein is equal to 3. The state variable can be line frequency, or line voltage, or both. In the equation above, h(x) can be a barrier function defined as the difference between the current value of the state variable and a minimum value of the state variable, such that $h(x) = x - x_{min}$, and $x_{min}$ can be set to maintain a safety set for the state variable. The safety set can correspond to line frequency around a nominal operating range, such as a safety set of between 59.5 Hz and 60.5 when nominal operating frequency of 60 Hz. If the safety set is based on voltage, the safety set can similarly be set as a band around nominal operating range. The distributed energy element can be a grid-forming inverter or a grid-following inverter. The controller can be configured to update the control setpoint at a predefined frequency. The distributed energy resources can include any one or more of a solar power installation, a battery installation, and a wind power installation.

In other aspects, a power distribution network can include a system of distribution lines interconnecting a plurality of terminals, and a plurality of the distributed energy generation elements as described above. Each of the plurality of distributed energy generation elements can be electrically coupled to a corresponding one of the plurality of terminals. A plurality of loads can also be connected to the network, each of the plurality of loads electrically coupled to a corresponding one of the plurality of terminals.

Similarly to the distributed energy generation element described above, the power distribution network can use an odd number for n, and in one example n can be three. The component h(x) can be a barrier function defined as the difference between the current value of the state variable and a minimum value of the state variable, such that $h(x) = x - x_{min}$.

According to another aspect, a method for maintaining a power distribution network within a safety set for a parameter is described. The method includes powering the network from a source of distributed energy. The power is controlled in the method according to a control setpoint using a controller, by adjusting the control setpoint to maintain the state variable x according to the equations:

$$\begin{cases} u \ge -\dfrac{1}{g(x)}(f(x) + \alpha h(x)^n) & \text{if } g(x) > 0 \\ u \le -\dfrac{1}{g(x)}(f(x) + \alpha h(x)^n) & \text{if } g(x) < 0 \end{cases}$$

where u is the control setpoint, and the controller operates according to a state model in which the derivative of the state variable $\dot{x} = f(x) + g(x)u$.

Similarly to the networks and devices described above, n is an odd number in some aspects, and can be set to three in a specific example. The component h(x) is a barrier function defined as the difference between the current value of the state variable and a minimum value of the state variable, and can be defined such that $h(x)=x-x_{min}$.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 2A is a diagrammatic representation of droop control showing both QV droop, while

DETAILED DESCRIPTION

Figure 1:
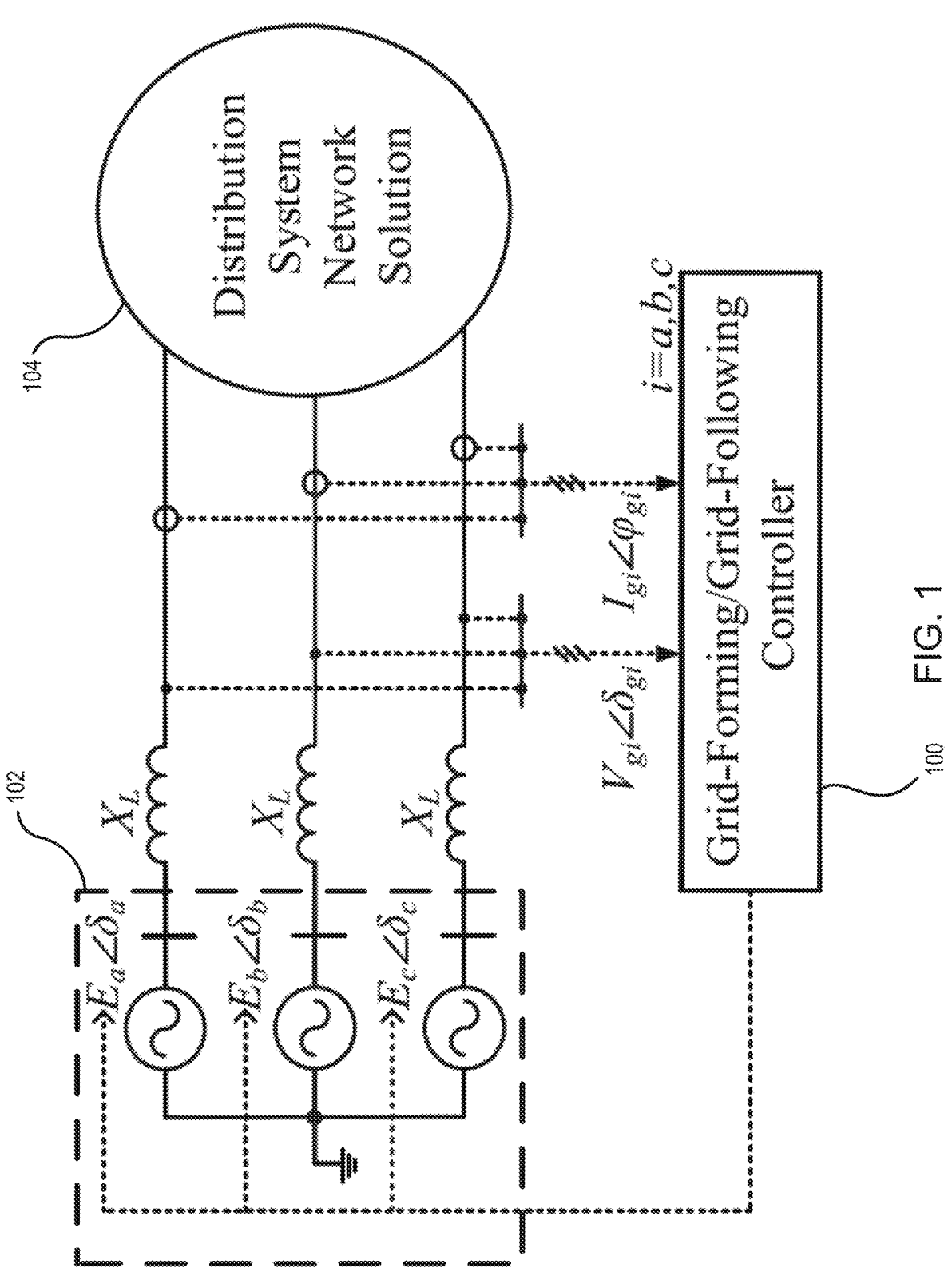
FIG. 1 is a schematic view of a grid-forming inverter and corresponding controller coupled to a power distribution network.

Reference will now be made in detail to exemplary aspects of the present disclosure that are illustrated in the accompanying drawings. Wherever possible, the same reference numbers will be used throughout the drawings to refer to the same or like parts.

The following discussion of the invention uses terminology that has specific meaning within the field of electrical grid management. Several of these terms are defined herein for clarity.

In a power distribution grid or network (which are referred to interchangeably herein), there can be multiple types of power generation and multiple types of loads. Power generation can be provided by sources such as a conventional power plant, or by a distributed source such as a renewable energy installation, an electric vehicle, or other battery that can be grid-connected, for example. Loads can be homes, factories, offices, or any of a variety of other users of electrical power that are connected to the grid.

Loads can be resistive, meaning they do not have capacitive or inductive attributes. Alternatively, loads can be reactive, meaning that they have capacitive or inductive attributes. Most loads and many power generation sources will have both resistive and reactive components. The capacity of an inverters is referred to herein as $S_{capacity}$.

As discussed in more detail below, disruptions can also occur that connect or disconnect parts of the grid, which affects power flow. Accordingly, a power distribution grid can be mapped between locations referred to as "terminals." These terminals can be associated with a location where distribution lines split or combine, or where specific power generation sources or loads are located, or any other location throughout the power distribution grid where information about the status of the grid is helpful in balancing power input and output.

At each terminal, data regarding the status of the electrical distribution grid can be measured. Measured terminal frequency is referred to herein with the character omega, $\omega$. Terminal three-phase voltage can also be measured, referred to herein as V.

In a power distribution network, there are multiple categories of power. These are often referred to as "real power," "reactive power," and "apparent power."

Real power also referred to as active power or true power, is the component of electrical power that performs work at loads throughout a network. Real power is referred to with the symbol P. For example, measured value of the "net real power generation" (referred to herein as $P_{inv}$), real power reference input (or, set-point) for a subsequent time step (referred to herein as $$P_{set}^{next}$$

and nominal real power set-point (referred to herein as $$P_{set}^{nominal}$$

are referred to throughout this disclosure.

Reactive power is a component of electrical power that does not directly perform work at loads but is generated by capacitive and inductive loads throughout the network. Reactive power can be essential for the operation of inductive loads like motors, transformers, and solenoids. Reactive power does not add to the actual energy consumption but supports the voltage and ensures the proper functioning of the network or grid. For example, measured value of the net reactive power generation (referred to herein as $Q_{inv}$), reactive power reference input (or, set-point) in a subsequent time step (referred to herein as $$Q_{set}^{next}$$

and nominal reactive power reference input (referred to herein as $$Q_{set}^{nominal}$$

are referred to throughout this disclosure.

Apparent power is a function of real power and reactive power. In an AC system, such as those used in most power distribution networks, apparent power $S = \sqrt{P^2 + Q^2}$.

The "steps" referred to above refer to time periods. Typically, grid balancing involves making adjustments at some time interval. As loads and generation change, or as connections between terminals are added or removed, the amount of power generation and the routing of power throughout the grid can be adjusted at each step. Adjustments can include providing more or less power from generation sources, or adjusting the flow of power through the grid, or both. One parameter that affects how power flows through the grid is referred to as droop gain.

Droop gain, also known as droop compensation or droop control, refers to a parameter that can be used in voltage regulation to maintain a stable output voltage under varying load conditions. Droop gain can be used to regulate output voltage when multiple sources or components are connected in parallel. When these sources are combined, a droop control mechanism can be used to provide an equitable distribution of the load and power-sharing. As load increases, the output voltage can be decreased to encourage other parallel sources to contribute more power. Similarly, when the load decreases, the output voltage increases, allowing the other sources to reduce their power output proportionally. Droop gain is often represented as a slope in the voltage regulation curve, which determines how much the output voltage will change in response to changes in the load. A smaller droop gain means a tighter regulation, where the output voltage stays more constant, while a higher droop gain allows for greater sharing of the load.

In this disclosure, P-f droop gain (referred to herein as $m_p$) and Q-V droop gain (referred to herein as $m_q$) are used to refer to two types of droop gain. Q-P droop gain $m_p$, also known simply as droop gain or frequency droop, is distinguishable from Q-V droop gain $m_q$ in that the former relates to real power while the latter relates to reactive power.

Q-V droop gain $m_q$, also known as reactive power-voltage droop gain, is used in voltage regulation to maintain a stable voltage profile and share reactive power demand among parallel-connected devices, such as synchronous generators or inverters. Q-V droop gain can be represented as a slope in the reactive power-voltage (Q-V) regulation curve. Where the droop gain is positive, reactive power output is increased with voltage. This helps to supply more reactive power to the system when the voltage rises, supporting voltage stability. On the other hand, where Q-V droop gain is negative, increasing voltage causes reduction in reactive power output, which helps in mitigating overvoltage conditions. Control of reactive power through Q-V droop gain can promote stable voltage levels and smooth power flow among distributed energy sources, contributing to a reliable and efficient operation of the power grid to which they are connected.

The definitions above provide a short explanation of the key concepts used throughout this application, but are not exhaustive. Each of these terms is known in the field of electrical grid and distribution networks. For example, W. Du et al., *Modeling of grid-forming and grid-following inverters for dynamic simulation of large-scale distribution systems*, IEEE Trans. Power Delivery, vol. 36, no. 4 (August 2020) describes models for grid balancing using droop control in defining grid-following and grid-forming dynamic techniques for enhancing grid stability.

It has been discovered that by setting power generation levels $P_{set}$ for the various terminals within a power distribution grid appropriately, the safety set of frequency and voltage can be maintained even in the event of significant disruptions to generation, loads, or connections between terminals.

In addition to the commonly used terms described above, this disclosure uses the following control, state, and parameter equations that are shown and described in more detail with respect to the figures:

$$u = (P_{set}^{next}, Q_{set}^{next})$$

$$x = \left(\omega, V_{inv}, P_{set}^{nominal}, Q_{set}^{nominal}, P_{inv}, Q_{inv}\right)$$

$$\mu = (X_L, \tau, m_p, m_q, k_{pv}, k_{iv}, S_{capacity})$$

where u are the active and reactive power set-points modified by the proposed controller; x are the real-time measurement/updates of inverter terminal frequency ($\omega$), inverter terminal voltage magnitude ($V_{inv}$), nominal active and reactive power set-points, and measured active and reactive power injections at the inverter terminal. Finally, $\mu$ are the parameters used in the control design, that include the coupling reactance ($X_L$), measurement filter time-constant ($\tau$), P-f and Q-V droop gains ($m_p$ and $m_q$, respectively), internal Q-V proportional-integral control loop parameters ($k_{pv}$ and $k_{iv}$), and the apparent power capacity of the inverter ($S_{capacity}$).

FIG. 1 shows a typical three-phase grid-connected inverter that may be located at a terminal of a power distribution grid. A similar diagram is shown in W. Du et al., at FIG. 5 thereof. Like W. Du et al., FIG. 1 shows an inverter equivalent circuit modeled as a three-phase controllable voltage. Unlike W. Du et al., however, controller 100 of FIG. 1 configured to apply the new grid-stabilizing techniques described herein. Controller 100 is coupled to internal node 102.

FIG. 1 shows $E_a \angle \delta_a$, $E_b \angle \delta_b$, and $E_c \angle \delta_c$, which represent the three phasor voltages at the internal node 102 of the inverter. $X_L$ denotes the reactance of the line that connects the internal node 102 of the inverter to the grid terminal 104, which is the point of common coupling with the distribution system network.

FIG. 1 also shows $V_{grid,\phi} \angle \delta_{grid,\phi}$, representing the three-phase voltage at the point of common coupling. FIG. 1 further shows $I_{grid,\phi} \angle \varphi_{grid,\phi}$, denoting the three-phase current injected from the point of common coupling for the terminal into the grid. In the following we derive the mathematical model of the dynamics of the two different kinds of inverters: grid-following and grid-forming.

Controller 100 can be used to control a grid-forming inverter 102, for example using the model based on the Consortium for Electric Reliability Technology Solutions (CERTS)/American Electric Power (AEP) microgrid testbed described in W. Du et al., and in R. H. Lasseter et al., *Certs Microgrid Laboratory Test Bed*, IEEE Transactions on Power Delivery, vol. 26 no. 1, pp. 325-332 (2010). The CERTS/AEP microgrid uses Q-V droop and P-f droop control loops, as described in more detail with respect to FIGS. 2A and 2B, to manage grid performance.

Figure 2A:
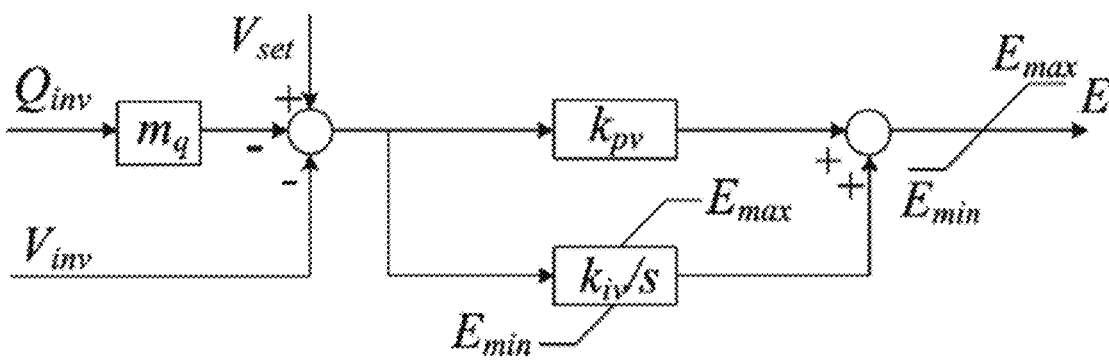
Figure 2B:
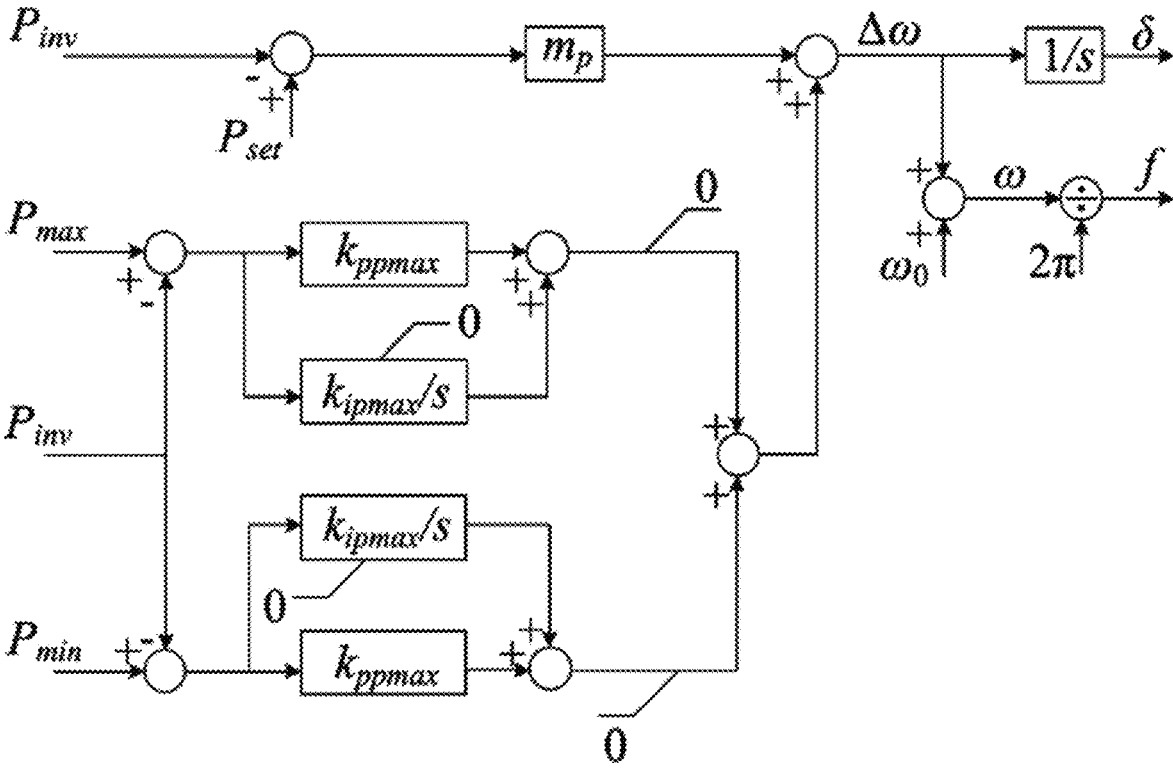
FIG. 2B is a diagrammatic representation of P-f droop control and overload migration control.

FIG. 2A is a diagrammatic representation of droop control showing Q-V droop, coupled with a proportional-integral controller loop with proportional gain $k_{pv}$ and integral gain $k_{iv}$, that generates the internal voltage magnitude (E) as output. FIG. 2B is a diagrammatic representation of P-f droop control, coupled with over-load and under-load migration control loops parameterized by proportional gain $k_{ppmax}$ and integral gain $k_{ipmax}$, which generates the internal voltage phase angle ($\delta$) as output.

FIGS. 2A and 2B show low-pass measurement filters that measure the active power (P), reactive power (Q), and the voltage (V) at the point of common coupling for the inverter. Consistent with the terminology above, $P_{grid,\phi}$ and $Q_{grid,\phi}$ are the active and reactive power injections from the inverter 102 (FIG. 1) into the grid 104 (FIG. 1), at phase $\phi \in \{a, b, c\}$, while $V_{grid,\phi}$ is the voltage at phase $\phi \in \{a, b, c\}$. $P_{inv}$ and $Q_{inv}$ are, respectively, the measured values of the active ($P_{grid}$) and reactive ($Q_{grid}$) power injections from inverter; while Vin, is the measured value of the voltage ($V_{grid}$) at the inverter terminal.

The measurement dynamics is modeled as a low-pass filter with a time-constant of $\tau$, as follows:

$$\tau \dot{P}_{inv} = -P_{inv} + \sum_{\phi \in \{a,b,c\}} P_{grid,\phi}$$

$$\tau \dot{Q}_{inv} = -Q_{inv} + \sum_{\phi \in \{a,b,c\}} Q_{grid,\phi}$$

$$\tau \dot{V}_{inv} = -V_{inv} + \sum_{\phi \in \{a,b,c\}} V_{grid,\phi}$$

The over- and under-load mitigation loops are orders of magnitude faster than the droop-control loops, so it can be assumed that $$P_{inv} \in [P_{min}, P_{max}]$$

with the assumption that $$\frac{\partial P_{set}}{\partial t} = 0$$

because $P_{set}$ changes more slowly than typical inverter droop control timescales.

The mathematical description of the P-f droop control loop shown in FIG. 2B are given by $$\dot{\delta} = \omega - \omega_0$$

$$\tau \dot{\omega} = -(\omega - \omega_0) + m_p \left( P_{set} - \sum_{\phi \in \{a,b,c\}} P_{grid,\phi} \right)$$

where $\tau$ is the measurement filter time-constant defined above, and $\delta$ is the phase angle of the internal voltage generated by the grid-forming inverter.

Similarly, the Q-V droop equations are given by:

$$\tau \dot{V}_{\varepsilon} = E_{set} - V_{\varepsilon} - E + \left( m_q - \frac{\dot{X}_L}{4E} \right) \left( Q_{set} - \sum_{\phi \in \{a,b,c\}} Q_{grid,\phi} \right)$$

$$\tau \dot{E} = k_{pv}(E_{set} - E) - (k_{pv} - \tau k_{iv})V_{\varepsilon} + k_{pv}\left( m_q - \frac{X_L}{4E} \right) \left( Q_{set} - \sum_{\phi \in \{a,b,c\}} Q_{grid,\phi} \right)$$

where $E_{set}$ is set as being equal to $$V_{set} + \frac{XQ_{set}}{4E},$$

and E is the magnitude of the internal voltage generated by the grid-forming inverter.

Based on the P-f droop equations and the Q-V droop equations above, a new control system is described herein that provides additional supporting functionalities beyond device-level controls in order to maintain local voltage and frequency within the safety set specified by grid operational standards. This is achieved by use of barrier functions in the safety controls.

First, a model is defined in which $$\dot{x} = f(x) + g(x)u$$

where x is a dynamic state variable and u refers to control setpoints. A safety set may include a condition that the state variable stays above a minimum, for example: $x \geq x_{min}$.

The control setpoint u may be adjusted in such a way that the state variable x does not violate this safety condition. This can be accomplished by creating a barrier function $$h(x) = x - x_{min}$$

and defining it such that $$\begin{cases} h \geq 0 \Rightarrow \text{safe} \\ h < 0 \Rightarrow \text{unsafe} \end{cases}$$

Then the control setpoint u is adjusted so that the following condition on the time-derivative of the barrier function is satisfied for some positive scalar $\alpha$:

$$\dot{h} \geq -\alpha h^3$$

or rewritten in terms of x, $$f(x) + g(x)u \geq -\alpha h(x)^3$$

such that $$\begin{cases} u \geq -\dfrac{1}{g(x)}\left(f(x) + \alpha h(x)^3\right) & \text{if } g(x) > 0 \\ u \leq -\dfrac{1}{g(x)}\left(f(x) + \alpha h(x)^3\right) & \text{if } g(x) < 0 \end{cases}$$

The use of $h(x)^3$ in the control setpoint u provides a few significant advantages. First, as noted above, the barrier function is satisfied where the derivative of h with respect to time is positive. By using the third power (as opposed to, for example, the square or the fourth power), negative values of h result in negative cubed values. Since non-negative values of the barrier function imply safe operation, using the third power of h results in a desirable effect in that the value of the barrier function will increase whenever it gets close to the safety set limit. Note that, other odd powers of the function h($\cdot$), such as $1^{st}$ order or higher orders ($5^{th}$, $7^{th}$) are not currently commercially desirable, since: 1) $1^{st}$ order term, h(x), does not offer the smoothness of resulting control adjustment, relying instead on bang-bang control actions whereby the adjusted set-points change abruptly as the trajectory (i.e., values of x(t)) crosses the boundary of the safety set; and 2) higher order ($5^{th}$, $7^{th}$, etc.) terms, while offering the smoothness of the controls adjustment around the boundary of the safety set, lead to rapid increases in control actions beyond the boundary of the safety set, that are undesirable for the stability and reliability of the full power systems network. However, in theory there may be devices, systems, or future componentry improvements that permit the use of higher-order odd-numbered powers to maintain systems within the boundaries of a safety set or other desired operating conditions.

As a first advantage of using the cube of h as shown in the equations above, close to the safety set boundary, the right-hand side of the equations above go to zero, and therefore the derivative of h with respect to time is greater than zero, such that the value of the barrier function increases at the boundary pushing the trajectory inside the safe region.

As a second advantage of using the cube of h as shown in the equations above, when well inside the safe region the right-hand side takes large negative values, such that the derivative of h with respect to time can be almost any value (whether positive or negative) without violating the boundary conditions. This has the effect of lifting restrictions on the control setpoint.

As a third advantage of using the cube of h as shown in the equations above, once outside the safe region the right-hand side becomes positive such that to satisfy the boundary conditions, the derivative of h with respect to time must be greater than zero, so that trajectories (defined by the values of the states x) are pushed towards (and into) the safe region by controlling the derivatives ($\dot{x}$) of the states.

The use of the third-order term $h^3$ promotes smoothness of the control adjustment. For example, when applied to safe frequency operation of microgrids with grid-forming inverters, the following two conditions on the active power control setpoint $$P_{set}^{next}$$

can be made:

$$P_{set}^{next} \geq P_{inv} + \frac{1}{m_p}\left(\omega - \omega_0 - (\omega - \omega_{min})^3\right) \Rightarrow \omega \geq \omega_{min} \text{(lower limit)}$$

$$P_{set}^{next} \leq P_{inv} + \frac{1}{m_p}\left(\omega - \omega_0 - (\omega - \omega_{max})^3\right) \Rightarrow \omega \geq \omega_{max} \text{(upper limit)}$$

Taking all of these into account, real power setpoint $$P_{set}^{next}$$

can be modified over time, using change control laws to adjust control gain $\alpha$ for maintaining frequency safety as set out below, wherein underscore omega refers to the low frequency limit of the safety set and overscore omega refers to the high frequency limit of the safety set:

$$P_{low} = \sum_{\phi \in \{a,b,c\}} P_{grid,\phi} + \frac{1}{m_p}\left(\omega - \omega_0 - (\omega - \omega_{min})^3\right)$$

$$P_{up} = \sum_{\phi \in \{a,b,c\}} P_{grid,\phi} + \frac{1}{m_p}\left(\omega - \omega_0 - (\omega - \omega_{max})^3\right)$$

$$P_{set} = \min\left(P_{up}, \max\left(P_{low}, P_{set}^{nominal}\right)\right)$$

$$P_{set}^{max} = \sqrt{S_{capacity}^2 - Q_{set}^2}$$

$$P_{set}^{next} = \min(P_{set}^{max}, \max(-P_{set}^{max}, P_{set}))$$

Throughout the remainder of this disclosure, the rule set above is referred to as the ruleset for self-aware local autonomous control (SLAC3R).

Figure 3:
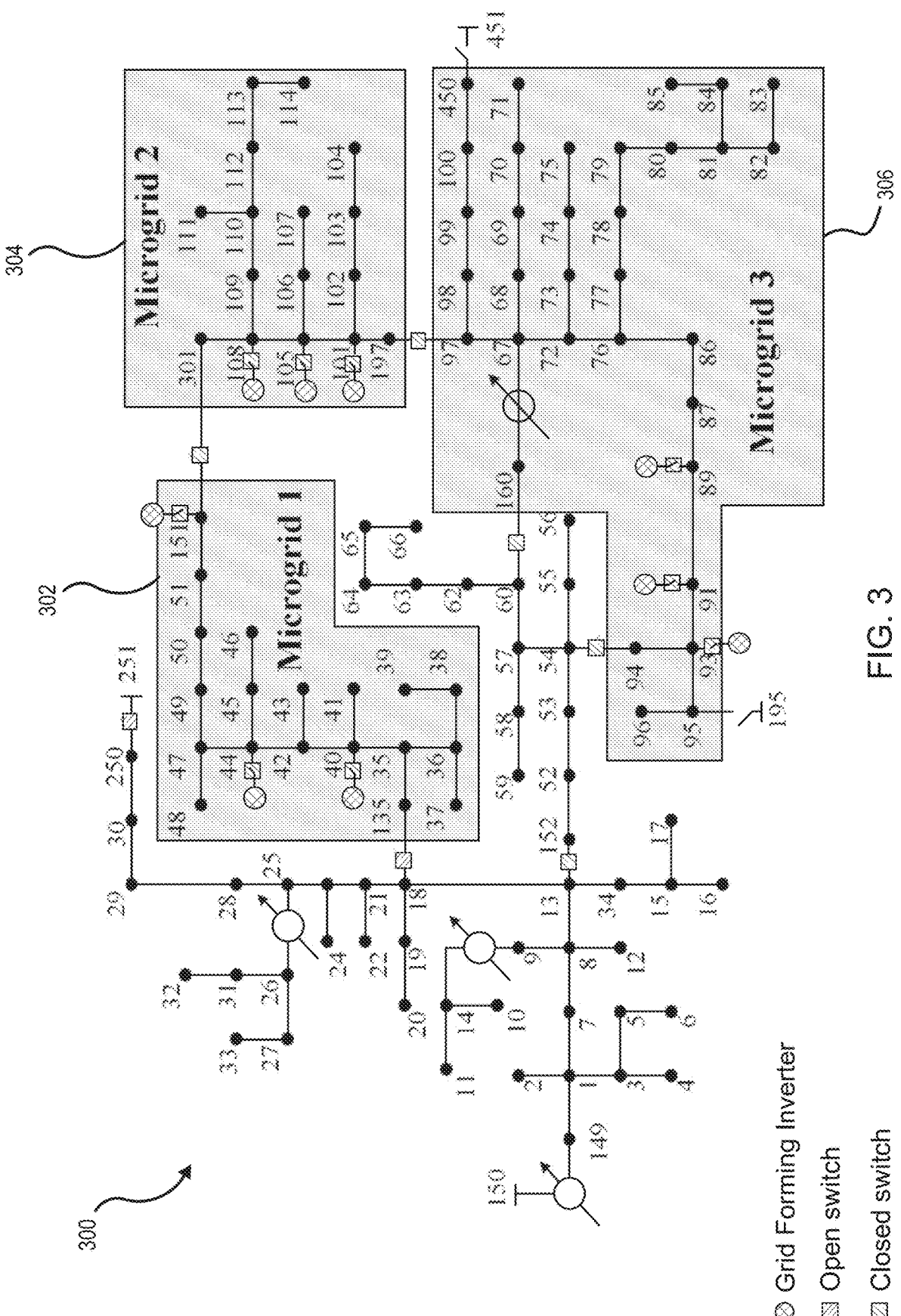
FIG. 3 is a simplified diagram of a power distribution network including three microgrids.

The control system used herein can address disconnection of a microgrid from one or more (or all) or its connections to a larger grid or other microgrids. FIG. 3, for example, shows a power distribution network 300 having a large number of terminals (shown as dots), and among these are a first microgrid 302, second microgrid 304, and third microgrid 306. As shown in FIG. 3, there are several crucial junctions between the power distribution network 300 and the microgrids 302, 304, and 306.

First microgrid 302 is connected to the power distribution network 300 only at one point, namely between terminal 18 and terminal 135. FIG. 3 shows this as being an open switch.

Second microgrid 304 is not connected to the power distribution network 300 directly, but instead it is connected only to the first microgrid 302 and the third microgrid 306. Second microgrid 304 is connected to first microgrid 302 at the connection between terminal 151 and terminal 301. Second microgrid 304 is connected to third microgrid 306 at the connection between terminal 197 and terminal 97. Both the connections from second microgrid 304 are shown as closed switches.

Third microgrid 306 is connected to second microgrid 304 as described above, at the closed switch between terminals 197 and 97. Additionally, third microgrid is connected to the power distribution network 300 at a closed switch positioned between terminals 94 and 54.

Several of the terminals of FIG. 3 include grid-forming inverters. That is, terminals that are marked as grid-forming inverters include some power supply such as a generator, a battery, or distributed energy source that can be used to feed power into the grid (i.e., create $P_{gen}$). In FIG. 3, terminals 40, 44, 89, 91, 93, 101, 105, 108, and 151 are shown as having grid-forming inverters coupled thereto. As such, each of these terminals 40, 44, 89, 91, 93, 101, 105, 108, and 151 can provide power using the control system formulae described above.

Figure 4A:
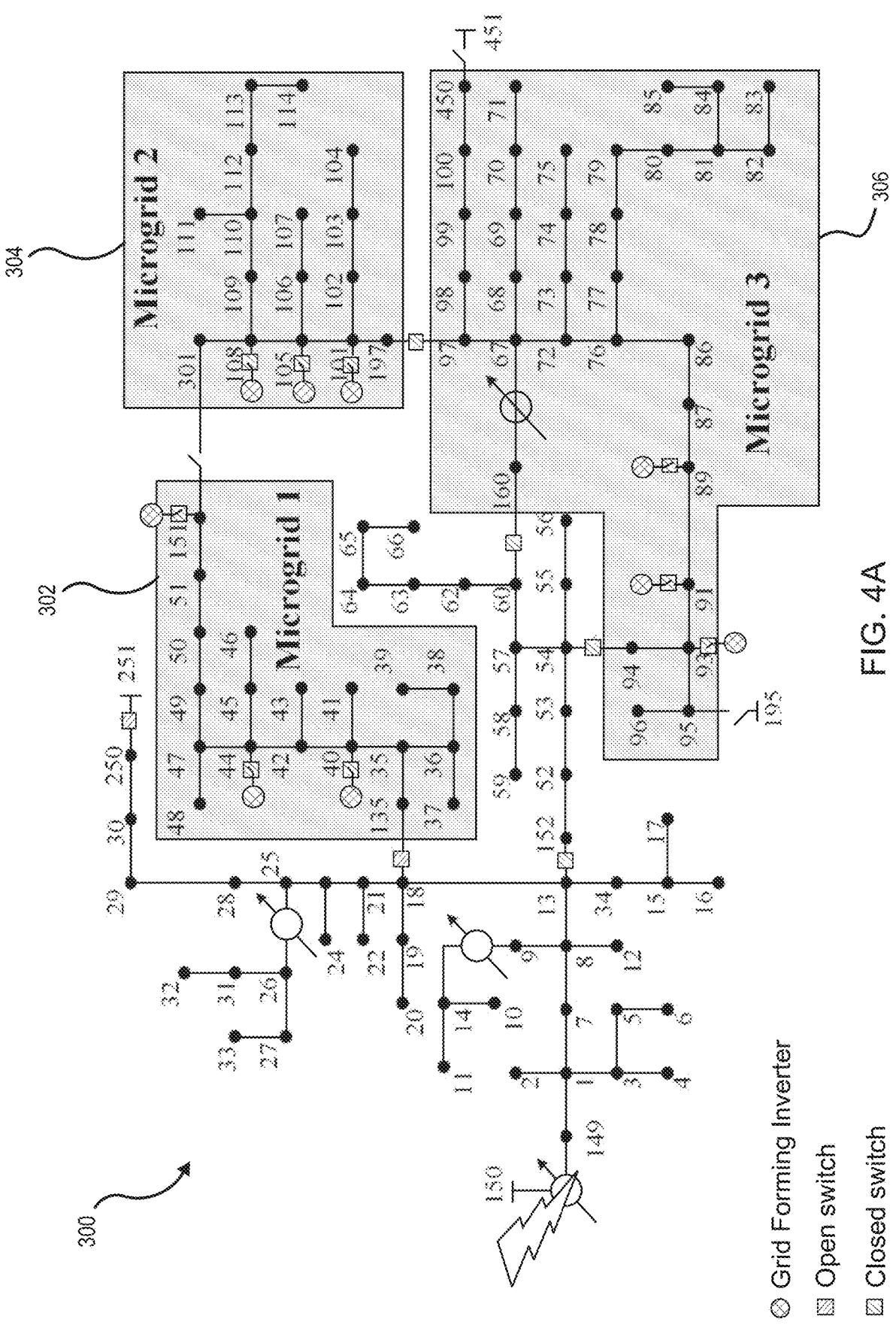
FIG. 4A shows the power distribution network of FIG. 3 after undergoing a disruption.

FIG. 4A shows the same power distribution network 300 connected to microgrids 302, 304, and 306. In contrast to FIG. 3, however, FIG. 4A shows a disruption at a transmission/distribution (TD) substation 150. This disruption can lead to the islanding of networked microgrids at a start time defined as t=1 second in a steady state.

Figure 4B:
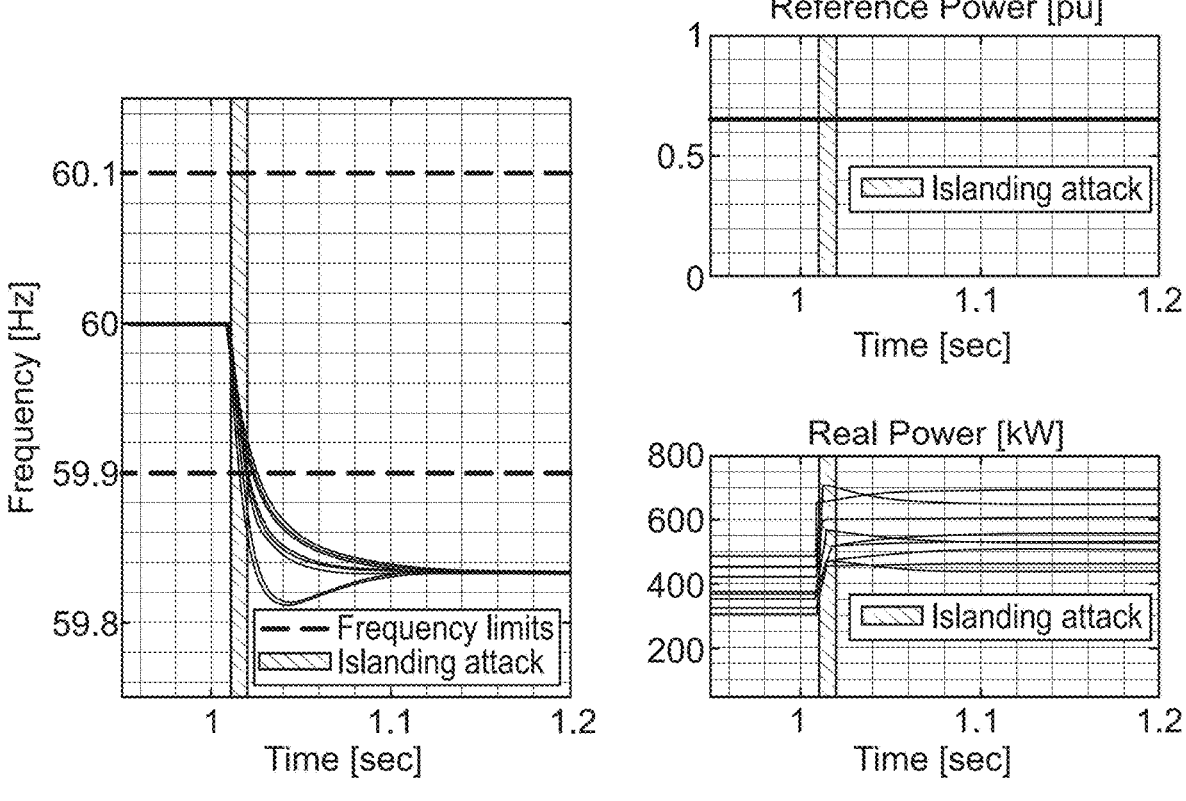
FIGS. 4B and 4C graphically show the effects of the disruption on the power distribution network of FIG. 4A, without and with application of the local controls as described herein, respectively.
Figure 4C:
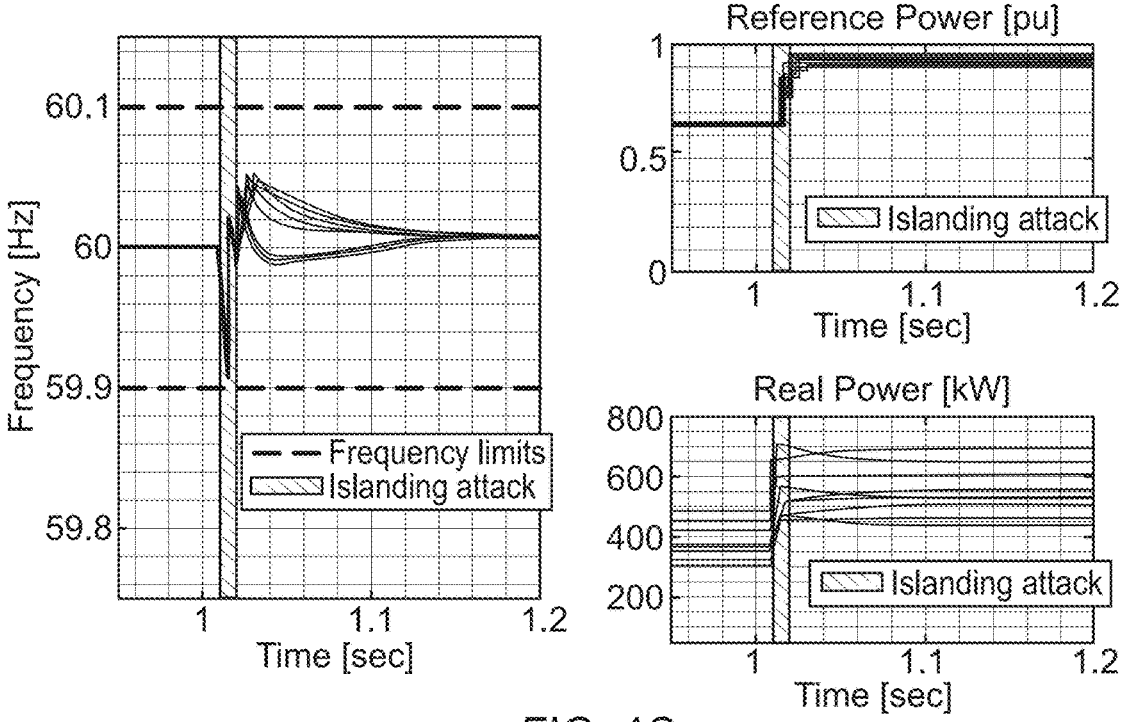

FIG. 4B shows the effects of the disruption between FIGS. 3 to 4A on frequency, reference power, and real power in the network using conventional grid-forming inverters. FIG. 4B, in contrast, shows the effects of the same disruption (the difference between FIG. 3 and FIG. 4A) when using self-aware local autonomous and semi-cooperative control from cross-layered resilience as described above. That is, if each grid-forming inverter in the power distribution network follows the SLAC3R model, then power and frequency will look as they do in FIG. 4C.

Comparing FIG. 4B to FIG. 4C, it is clear that frequency is contained in the safe region (shown with dashed lines) as the reference inputs are modified by the local controls, and the excursion below the lower frequency limit shown in FIG. 4B is avoided.

Figure 5A:
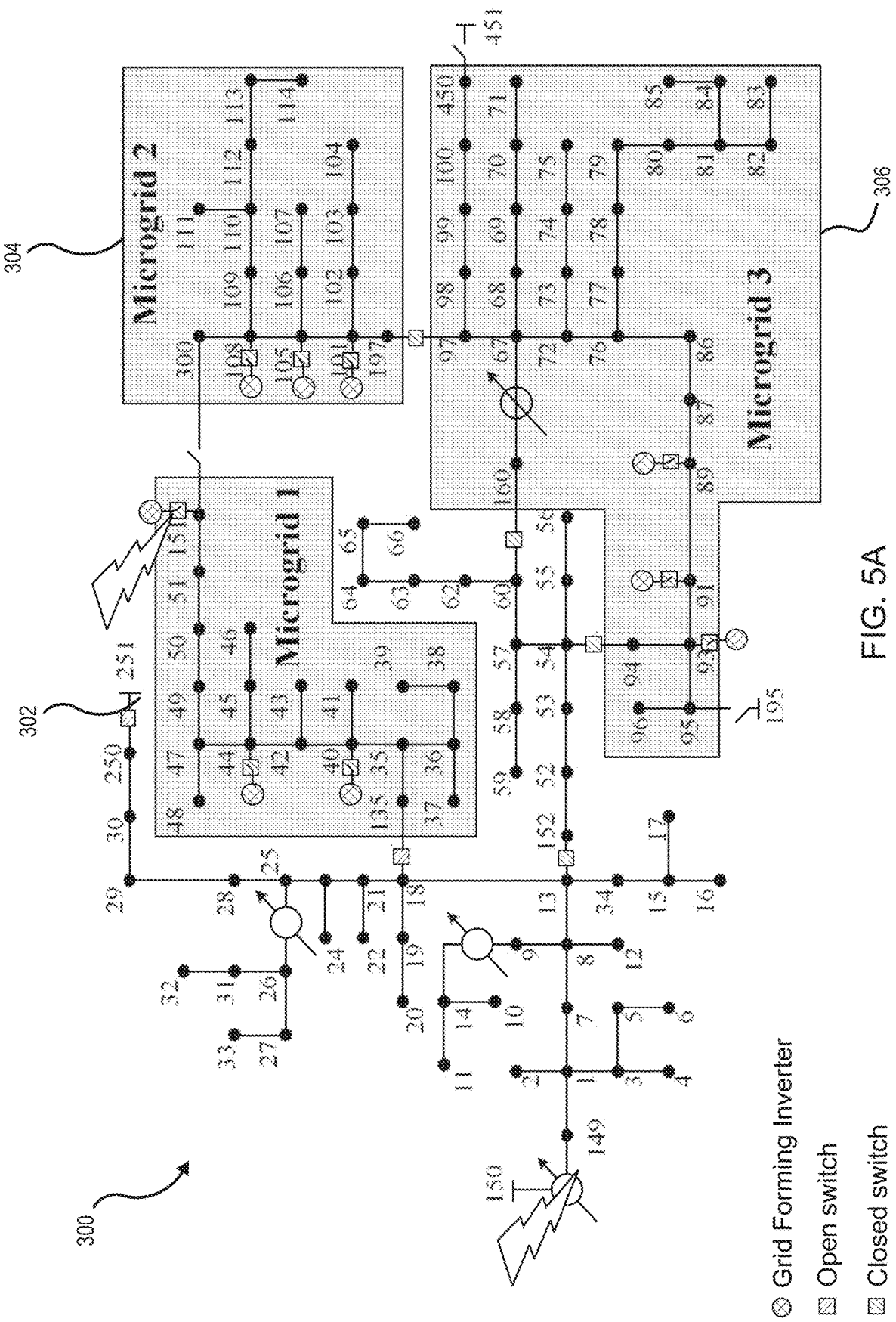
FIG. 5A shows the power distribution network of FIG. 3 after undergoing a disruption.

FIG. 5A shows the same grid as FIG. 4A, but in addition to a disruption at the TD substation 150 there is also a disruption at grid-forming inverter 151. Power provided to first microgrid 302 therefore can arrive only from grid-forming inverters 40 and 44.

Figure 5B:
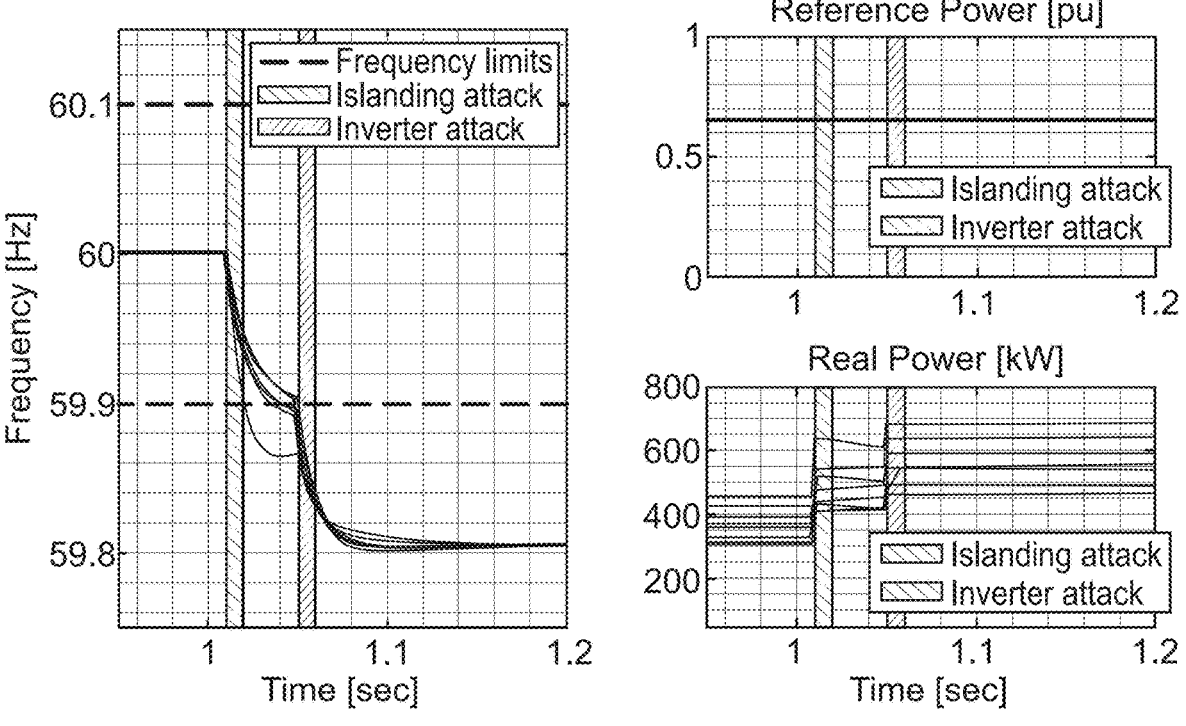
FIGS. 5B and 5C graphically show the effects of the disruption on the power distribution network of FIG. 5A, without and with application of the local controls as described herein, respectively.
Figure 5C:
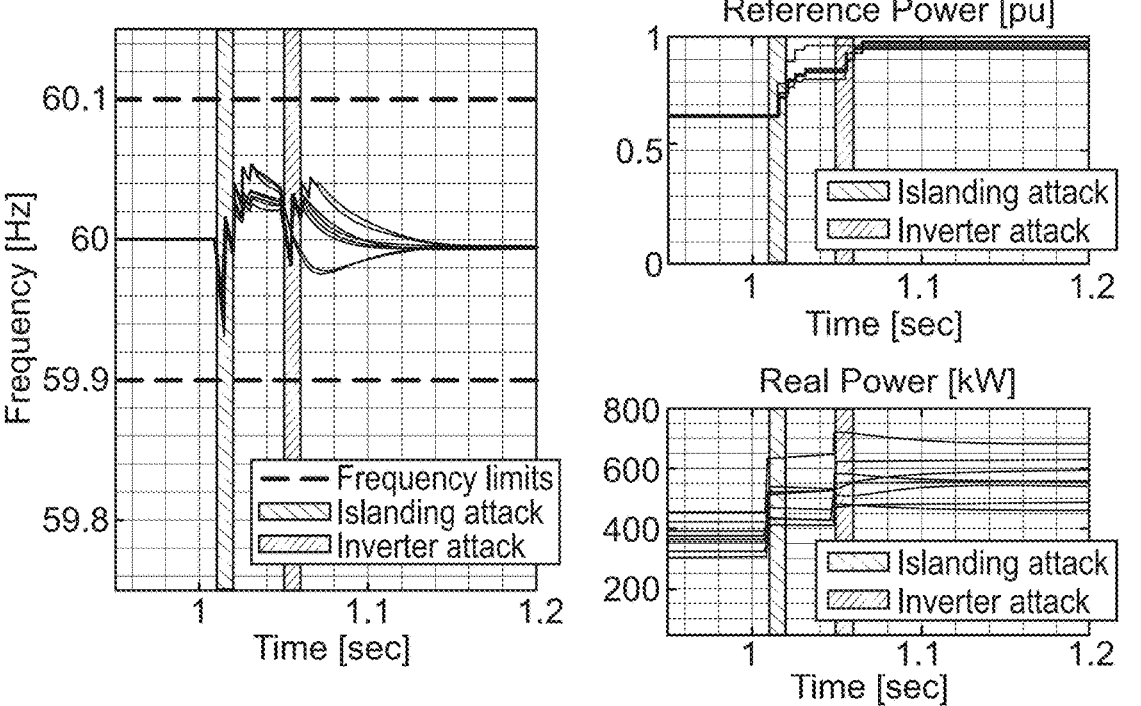

FIGS. 5B and 5C, similar to FIGS. 4B and 4C, show the effects of disruption on the power distribution network 300. Specifically, FIGS. 5B and 5C show the disruptions depicted in FIG. 5A occurring one after the other (first the islanding attack at t=1, and the inverter attack occurring at time t=1.05 seconds). As shown in FIG. 5B, the line frequency falls outside of the safety set even before the inverter attack begins. After the inverter attack the frequency is significantly outside the safety set. Real power varies significantly after both attacks.

In contrast, as shown in FIG. 5C the SLAC3R controls maintain frequency within the safety set at all times. Reference power adjusts after each attack, as does real power, preventing excursions that could cause further cascading disconnections or other errors.

Figure 6A:
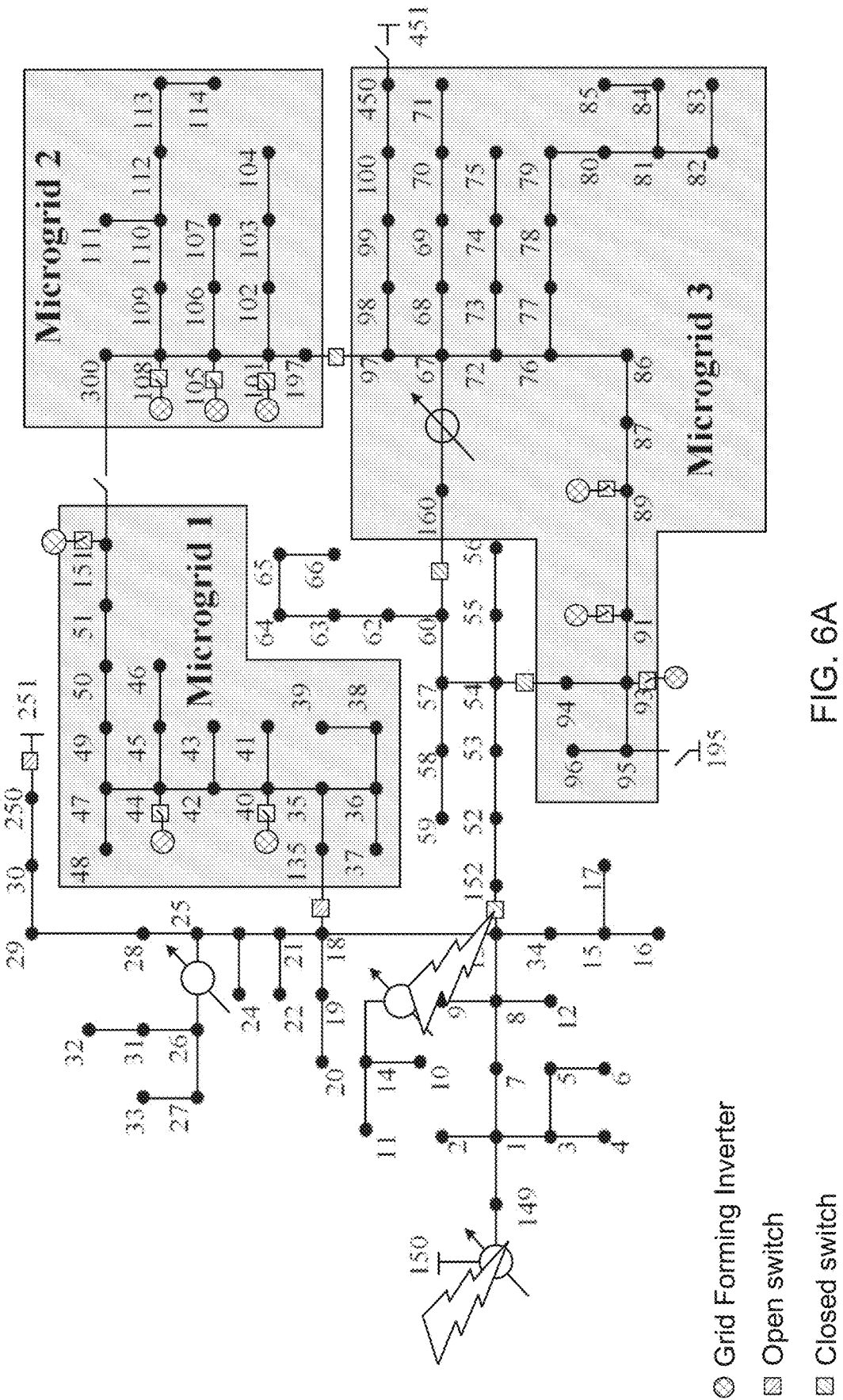
FIG. 6A shows the power distribution network of FIG. 3 after undergoing a disruption.

FIG. 6A shows the same power distribution network 300 of FIGS. 3, 4A, and 5A, but with different attacks or failure modes. Like FIG. 5A, there is an islanding attack and an inverter attack. However, the location of the inverter attack is different in FIG. 6A as compared to FIG. 5A, the inverter attack in FIG. 6A instead occurs at the lateral distribution feeder connecting terminals 13 and 152 at time t=1.05 seconds.

Figure 6B:
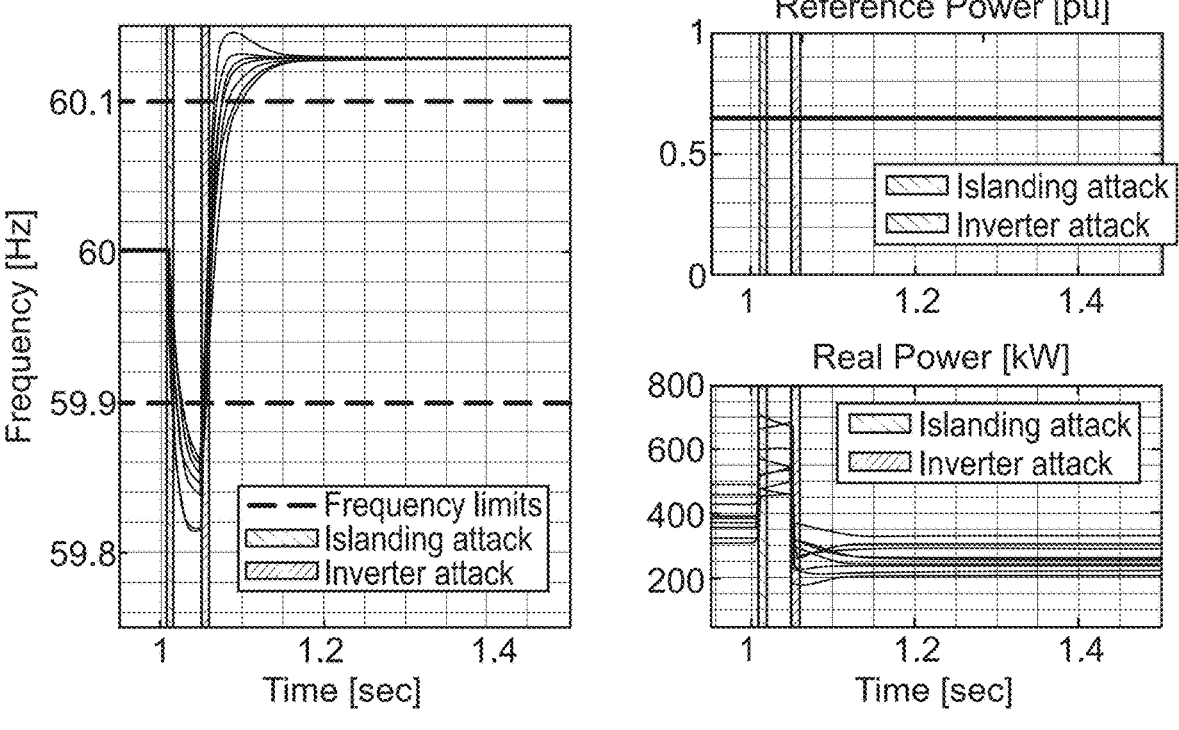
FIGS. 6B and 6C graphically show the effects of the disruption on the power distribution network of FIG. 6A, without and with application of the local controls as described herein, respectively.
Figure 6C:
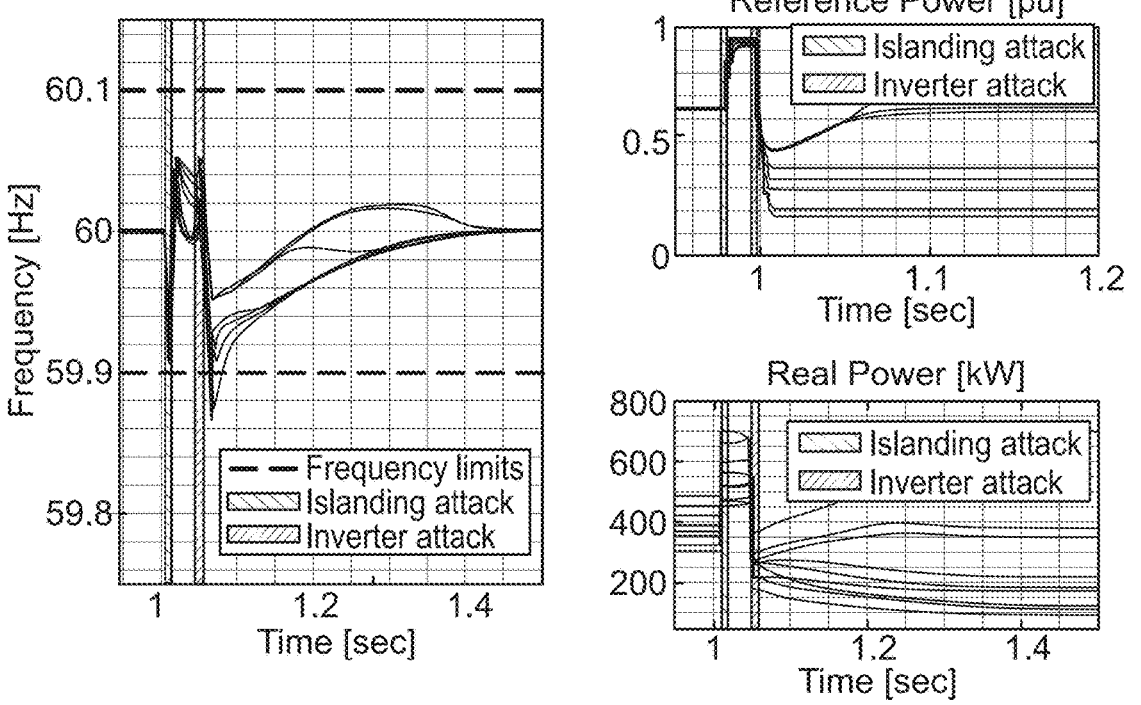

As shown in FIG. 6B, the combined effects of these two disruptions causes the frequency of the power distribution network to first drop below the safety set, then exceed the maximum frequency of the safety set. In contrast, as shown in FIG. 6C, the use of SLAC3R local controls maintains the frequency within the safe region after the first disruption, and after a brief excursion also brings frequency back into the safe region (and indeed nearly exactly 60 Hz) after the second disruption.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

Various advantages and novel features of the present disclosure are described herein and will become further readily apparent to those skilled in this art from the following detailed description. In the preceding and following descriptions the preferred embodiment of the disclosure have been shown and described by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

What is claimed is:

1. A distributed energy element for maintaining a state variable of a power distribution network, the distributed energy element comprising:

a source of distributed energy; and a grid-forming or grid-following controller configured to output an amount of electrical energy from the source of distributed energy that varies as a function of time, wherein the amount of electrical energy is determined by a control setpoint, and wherein the controller is configured to adjust the control setpoint to maintain the state variable x according to the equations:

$$\begin{cases} u \geq -\dfrac{1}{g(x)}(f(x)+\alpha h(x)^n) & \text{if } g(x) > 0 \\[2mm] u \leq -\dfrac{1}{g(x)}(f(x)+\alpha h(x)^n) & \text{if } g(x) < 0 \end{cases}$$

where u is the control setpoint, x is a dynamic state variable, h(x) is a barrier function defined as $h(x)=x-x_{min}$ and $x_{min}$ is a minimum value of the state variable, $\alpha$ is a positive scalar, f(x) and g(x) are functions defining a state model, and the controller operates according to the state model in which the derivative of the state variable $\dot{x}=f(x)+g(x)u$.

2. The distributed energy element for maintaining the state variable of the power distribution network of claim 1, wherein n is any odd number.

3. The distributed energy element for maintaining the state variable of the power distribution network of claim 2, wherein n is 3.

4. The distributed energy element for maintaining the state variable of the power distribution network of claim 1, wherein the state variable is line frequency.

5. The distributed energy element for maintaining the state variable of the power distribution network of claim 1, wherein the state variable is line voltage.

6. The distributed energy element for maintaining the state variable of the power distribution network of claim 1, wherein $x_{min}$ is set to maintain a safety set for the state variable.

7. The distributed energy element for maintaining the state variable of the power distribution network of claim 6, wherein the safety set corresponds to line frequency of between 59.5 Hz and 60.5.

8. The distributed energy element for maintaining the state variable of the power distribution network of claim 1, wherein the distributed energy element is a grid-forming inverter.

9. The distributed energy element for maintaining the state variable of the power distribution network of claim 1, wherein the distributed energy element is a grid-following inverter.

10. The distributed energy element for maintaining the state variable of the power distribution network of claim 1, wherein the controller is configured to update the control setpoint at a predefined frequency.

11. The distributed energy element for maintaining the state variable of the power distribution network of claim 1 wherein the distributed energy resources comprise one of a solar power installation, a battery installation, and a wind power installation.

12. A power distribution network comprising:

a system of distribution lines interconnecting a plurality of terminals;

a plurality of the distributed energy generation elements of claim 1, each of the plurality of distributed energy generation elements electrically coupled to a corresponding one of the plurality of terminals; and a plurality of loads, each of the plurality of loads electrically coupled to a corresponding one of the plurality of terminals.

13. The power distribution network of claim 12, wherein n is an odd number.

14. The power distribution network of claim 13, wherein n is 3.

15. A method for maintaining a power distribution network within a safety set for a parameter, the method comprising:

powering the network from a source of distributed energy;

controlling the powering of the network according to a control setpoint using a controller, by adjusting the control setpoint to maintain the state variable x according to the equations:

$$\begin{cases} u \geq -\dfrac{1}{g(x)}(f(x) + \alpha h(x)^n) & \text{if } g(x) > 0 \\ u \leq -\dfrac{1}{g(x)}(f(x) + \alpha h(x)^n) & \text{if } g(x) < 0 \end{cases}$$

where u is the control setpoint, x is a dynamic state variable, h(x) is a barrier function defined as $h(x) = x - x_{min}$ where $x_{min}$ is a minimum value of the state variable, $\alpha$ is a positive scalar, f(x) and g(x) are functions defining a state model, and the controller operates according to the state model in which the derivative of the state variable $\dot{x} = f(x) + g(x)u$.

* * * * *